Patented Mar. 8, 1949

2,463,500

UNITED STATES PATENT OFFICE 2,463,500

OXIDATION OF BETA,BETA-THENYL-HYDROXYLAMINE

Howard D. Hartough, Pitman, N. J., assignor to Socony-Vacuum Oil Company, Incorporated, a corporation of New York No Drawing. Application January 22, 1947, Serial No. 723,661

5 Claims. (Cl. 260—329)

The present invention relates to the preparation of oxidation products of thiophene and, more particularly, to the preparation of thiophenealdehyde, thiophenecarboxylic acid and thiophenedicarboxylic acid.

Thiophenealdehyde, according to Steinkopf, has been obtained by dry distillation of 2-thienylglyoxylic acid in a stream of carbon dioxide. Thiophenealdehyde has also been obtained by the reaction of formic acid ester and 2-thienyl-magnesiumiodide and hydrolysis of the corresponding acetal with dilute hydrogen chloride. The aldehyde has also been obtained by passing hydrogen sulfide into an aqueous solution of chlorodiketopentamethylene. When 2-thenoylchloride is reduced with hydrogen in toluene or xylene in the presence of palladium precipitated on barium sulfate only about 10 to 20 per cent of aldehyde is obtained in addition to the thiophenecarboxylic acid anhydride. The direct oxidation of thiophene compounds, in general, has not been successful because the nuclear sulfur oxidizes most readily with the consequent production of products of ring rupture. However, it now has been found that the oxidation of hydroxylamine derivatives of thiophene with the usual oxidation reagents, permanganates, hydrogen peroxide, sodium peroxide, ammonium persulfate, potassium dichromate, dodecanoyl peroxide, benzoyl peroxide and other oxidation agents having oxidation potentials of the same order of magnitude produces thiophenealdehyde, thiophenecarboxylic acid and thiophenedicarboxylic acid.

It is an object of the present invention to provide a method for producing oxidation products of thiophene by oxidation of hydroxylamine derivatives of thiophene. It is another object of the present invention to provide a method for producing thiophenealdehyde, thiophenecarboxylic acid and thiophenedicarboxylic acid. Other objects and advantages will become apparent from the following description.

In general, it has been discovered that thiophene derivatives, particularly thiophene derivatives having an oxygen atom in a side chain and especially thiophene derivatives having an —NOH— group in a side chain can be readily oxidized to aldehydes and carboxylic acids by means of the usual oxidizing agents using conventional procedures. Thus, thiophenealdehyde, thiophenecarboxylic acid and thiophenedicarboxylic acid can be obtained by oxidizing complex amines in liquid phase with alkali metal permanganate, ammonium persulfate, alkali metal dichromate, organic peroxides, such as dodecanoyl or benzoyl peroxide, hydrogen peroxide, sodium peroxide, barium peroxide and the like.

Thus, for example, a complex amine whose basic structure conforms empirically to the formula:

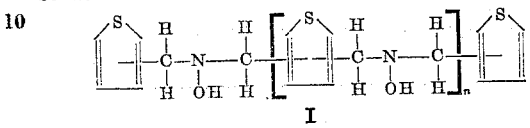

I where $n$ is a small integer and simple amines such as di-(2-thenyl) hydroxylamine

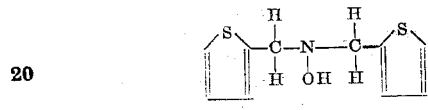

II and di-(5-hydroxymethylthenyl) hydroxylamine

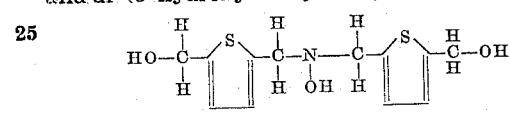

III can be oxidized to produce at least one of the thiophene derivatives, thiophenealdehyde, thiophenecarboxylic acid and thiophenedicarboxylic acid. That is to say, when a complex amine is oxidized with a conventional oxidizing agent in the customary procedure, 2,5-thiophenedicarboxylic acid, 2-thiophenecarboxylic acid and 2-thiophenealdehyde are produced. When di-(2-thenyl) hydroxylamine is oxidized in a similar manner 2-thiophenealdehyde and 2-thiophenecarboxylic acid are produced. When di-(5-hydroxymethyl-2-thenyl) hydroxylamine is oxidized in a similar manner only 2,5-thiophenedicarboxylic acid is produced.

Those skilled in the art will understand that when the side chain containing the —NOH— group is attached to the thiophene nucleus at the 3-, 4- or 5-position, the corresponding homologs will be obtained. Furthermore, when alkyl or other derivatives having one or more nuclear substituent groups in addition to an alkyl group containing the —NOH— group are oxidized in accordance with well established oxidation procedure, the corresponding derivatives of thiophenealdehyde, thiophenecarboxylic acid and thiophenedicarboxylic acid are obtained.

It is believed that the following equations represent the reactions involved:

(1) 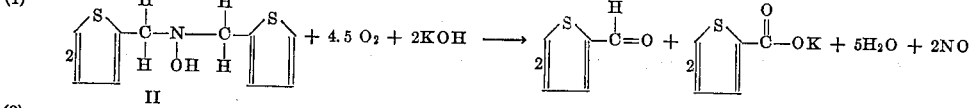

(2) 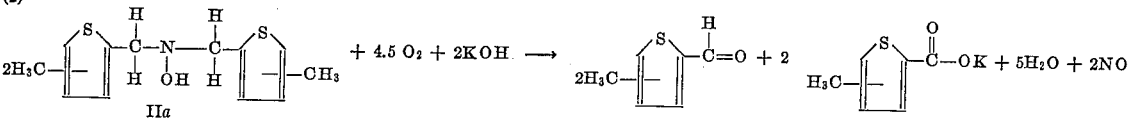

(3) 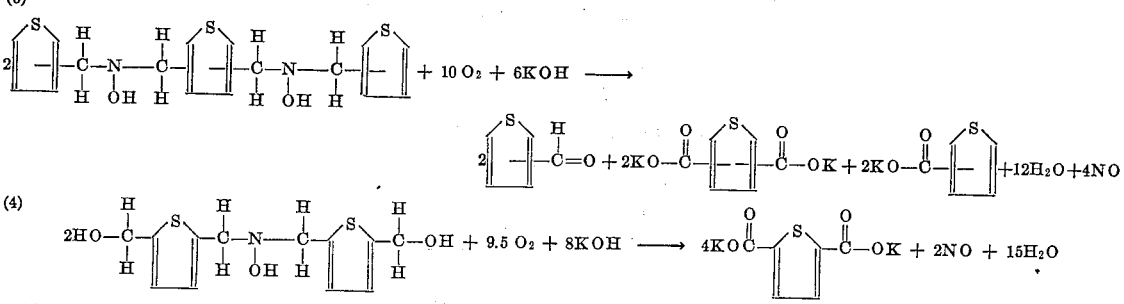

(4)

Illustrative of the procedure is the following example:

A complex mixture of amines as represented by Formulas I to III, column 2, was prepared by reacting about two moles of formaldoxime with one mole of thiophene as described in copending application for United States Letters Patent Serial No. 670,031, filed May 15, 1946, in the names of Howard D. Hartough and Everett H. Murray, Jr. Twenty parts by weight of the amine were mixed with forty parts by weight of sodium hydroxide in three hundred parts by weight of water and heated to boiling. Forty parts by weight of potassium permanganate in 300 parts by weight of water were slowly added. The 2-thiophenaldehyde was removed by steam distillation as it was formed. The thiophenaldehyde was identified by conversion to the semicarbazone which had a melting point of 218 to 219 degrees centigrade (uncorrected). The reaction mixture was cooled, the manganese dioxide removed by filtration and the aqueous solution evaporated to about one quarter (0.25) of its original volume. The solution was then acidulated and the thiophenecarboxylic acids recovered. These acids were recrystallized from water once, dried and then digested once with hot benzene. After cooling, the benzene solution was filtered and the insoluble material recovered. The benzene insoluble material was 2,5-thiophenedicarboxylic acid having a neutralization equivalent of 178 (calculated for $C_4H_2S(COOH)_2$, 172). The dicarboxylic acid was converted to the dimethyl ester by standard procedures. After recrystallization from methyl alcohol, the dimethyl ester melted at 147 to 148 degrees centigrade. (The melting point given in the literature is 151 degrees centigrade. The benzene solution from which the thiophenedicarboxylic acid had been removed was evaporated and the 2-thiophenecarboxylic acid recovered. After recrystallization from water the 2-thiophenecarboxylic acid melted at 128 to 129 degrees centigrade. A mixed melting point with an authentic sample of 2-thiophenecarboxylic acid (melting point 129 to 130 degrees centigrade) was obtained at 128 to 129 degrees centigrade.

From the foregoing those skilled in the art will appreciate that the novelty of the present invention does not emanate from the use of well known oxidizing agents and following well established procedures for oxidation reactions but in the discovery that, in contradistinction to thiophene and thiophene derivatives devoid of the —NOH— group such as dithenylamine, thiophene derivatives having the —NOH— group attached to the thiophene nucleus through an alkyl chain can be oxidized to aldehydes, monocarboxylic and dicarboxylic acids. Thus, while hydroxylamine derivatives of thiophene can be oxidized to aldehydes and carboxylic acids without cleavage, di-(2-thenyl)amine[$(C_4H_3S \cdot CH_2)_2NH$], for example, having no —NOH— group cannot be oxidized to thiophenealdehyde and thiophenecarboxylic acids because the heterocyclic sulfur atom is attacked in preference to the amine group causing ring rupture and the formation of undesirable oxidation products. Accordingly, the present invention relates to the oxidation of thiophene compounds containing a hydroxylamine group and preferably corresponding to the following formula:

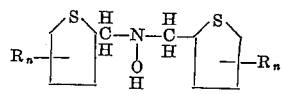

where R is H, an alkyl group, an aryl group $(CH_2NOHCH_2C_4H_mSR'_q)_n$ where $n$ is 1 to 3, R' is an alkyl or aryl group, $m$ is 0 to 3, $q$ is 0 to 3 and $m+q=3$ with conventional or customary oxidizing agents such as alkali and alkali earth metal peroxides, organic peroxides, alkali metal permanganates, alkali metal dichromates, alkali metal chlorates and perchlorates, ammonium persulfate and hydrogen peroxide. Those skilled in the art will recognize that the term "a beta, beta-thenylhydroxylamine" is used herein and in the claims to designate compounds of the general formula

in which R and R' are substituted or unsubstituted thenyl radicals.

I claim:
1. A method for obtaining 2-thiophenealdehyde and 2-thiophenecarboxylic acid which comprises reacting di-(2-thenyl)hydroxylamine and potassium permanganate in aqueous alkaline solution.
2. A method for preparing thiophenealdehydes and thiophenecarboxylic acids which comprises reacting di-(alkyl-2-thenyl) hydroxylamine with an oxidizing agent in alkaline solution.
3. A method of preparing thiophenealdehydes and thiophenecarboxylic acids which comprises reacting a beta,beta-thenylhydroxylamine and potassium permanganate in aqueous alkaline solution.
4. A method of preparing thiophenealdehydes and thiophenecarboxylic acids which comprises reacting beta,beta-substituted thenyl-hydroxylamine with an oxidizing agent in alkaline solution.
5. A method of preparing thiophenealdehydes and thiophene carboxylic acids which comprises reacting a beta,beta-thenylhydroxylamine with an oxidizing agent in alkaline solution.

HOWARD D. HARTOUGH.

REFERENCES CITED

The following references are of record in the file of this patent:
Acharya, Nature 136, 644 (1935).